United States Patent [19]

Peterson

[11] Patent Number: 5,570,513
[45] Date of Patent: Nov. 5, 1996

[54] HEADSPACE GAUGE

[76] Inventor: Thomas K. M. Peterson, 124 Stoney Point Rd., Courtland, Minn. 56021

[21] Appl. No.: 574,533

[22] Filed: Dec. 19, 1995

[51] Int. Cl.[6] .......................... G01B 5/00; G01B 121/00
[52] U.S. Cl. ................................................ 33/506; 33/810
[58] Field of Search ........................... 33/506, 810, 811, 33/812, 828, 531, 532; 86/24, 43

[56]  References Cited

U.S. PATENT DOCUMENTS

| | | | |
|---|---|---|---|
| 694,804 | 3/1902 | Stromberg | 33/828 |
| 2,212,884 | 8/1940 | Polasik | 33/811 |
| 2,325,423 | 7/1943 | Pembroke | 33/506 |
| 2,383,348 | 8/1945 | Sink | 33/506 |
| 2,444,136 | 6/1948 | Leasure | 33/828 |
| 2,553,704 | 5/1951 | Eckel | 33/506 |
| 2,585,521 | 2/1952 | Wandrus | 33/506 |
| 2,600,488 | 6/1952 | Crump | 33/506 |
| 2,823,458 | 2/1958 | Zabloudil | 33/506 |
| 3,209,461 | 10/1965 | Wilson | 33/506 |
| 3,217,417 | 11/1965 | Love et al. | 33/506 |
| 4,248,132 | 2/1981 | Blomseth | 33/506 |
| 4,918,825 | 4/1990 | Lesh et al. | 33/506 |
| 5,233,124 | 8/1993 | Peterson | 33/506 |

*Primary Examiner*—Thomas B. Will
*Attorney, Agent, or Firm*—Roger W. Jensen

[57]  ABSTRACT

Apparatus for measuring the headspace of the case of a cartridge using a caliper having a fixed blade and a movable blade composing a body member attached to one of the blades of the caliper. The body member has a longitudinally extending bore into which is inserted an annular extension of a bushing, the bushing having a bore preselected to be equal to or substantially similar to the datum reference circle of a case of the cartridge, the headspace of which is to be measured.

10 Claims, 2 Drawing Sheets

HEADSPACE GAUGE

BACKGROUND OF THE INVENTION

This invention provides a relatively inexpensive and convenient tool for rapidly measuring the headspace of cartridge cases, this being especially useful for gunsmiths and those that reload cartridge cases.

Useful background for an understanding of this subject is the article entitled "HEADSPACE . . . AND HOW IT IS MEASURED" by Major General J. S. Hatcher that is found on pages 67–69 of the book entitled "HAND LOADING" copyright 1981 by the National Rifle Association of America.

Rimmed cartridges, either rim fire or center fire, have a head which is larger in diameter than the body of the case. However, because rimmed cartridges present difficulties in feeding from box magazines, both center fire automatic pistols and many late model center fire rifles use rimless cartridges. The head of tie tireless cartridge is normally no larger in diameter than the body of tie case, but it does have a groove for the extractor cut into the body of the case just forward of the case head. As the rim thus formed is no larger than the body of the case forward of the head, there is no convenient way of using the rim for slopping the cartridge in chambering, and the cartridge stops by having its conical shoulder come in contact with a corresponding shoulder in the chamber.

For such cartridges, headspace is measured from the face of the closed bolt of the fire arm to a point where a circle of a certain size, called a datum circle, would intersect the cone of the shoulder on the chamber. The Hatcher publication at FIG. 9 depicts a number of prior art headspace gauges.

Headspace can either be too small or too great. Variation of headspace of either sense can create significant problems. For example if the chamber headspace is not large enough the bolt will not then close completely on a rifle, automatic pistol, or shotgun cartridge.

the cartridge headspace may be found too great in some cases because the cartridge has been stretched (in the case of reloads) by firing it in a gun that had excess headspace. If the casing is then reloaded without full length re-sizing and an attempt is made to use it in a gun with tight headspace, it may be found impossible to close the bolt.

If there is excess headspace in a gun there may be ignition trouble (misfires or hang fires) because the firing pin may not be able to give the primer a proper blow. Also accuracy may be diminished with excess headspace.

When a gun such as a high power rifle with excess headspace does fire, a stretched or ruptured cartridge may result with possible dangerous escape of gas to the rear around the bolt head. This rupturing of the cartridge case occurs because the firing pin blow drives the cartridge forward and then the internal pressure of the ignited powder expands the neck and sidewalls of the case outward and causes them to grip the walls of the chamber. The friction of the case walls against the chamber, together with the forward pressure of the gas on the inside of the case shoulder, combine to hold the front portion of the case forward, while the pressure of the powder gas acting on the inside rear of the case blows it back, causing a stretching, or even a separation, between the front and rear portions of the cartridge case.

Thus those skilled in the art know the importance of the measurement of headspace on a cartridge prior to the reloading thereof.

Another prior art headspace gauge is shown in the L. E. Wilson U.S. Pat. No. 3,209,461 issued Oct. 5, 1965.

SUMMARY OF THE INVENTION

The present invention is used with a caliper having a fixed jaw, blade or arm and a moveable blade, jaw or arm, this type of caliper being frequently used by machinists and others for measuring dimensions on a piece part to a fairly high level of accuracy. The case of the cartridge to be measured has a case head, a body, a neck, a tapered or conical shoulder connecting the body to the neck, and a datum line or datum reference circle on said shoulder, the longitudinal distance between the case head and the datum reference circle being defined as the headspace for the case of the cartridge.

Thus my invention provides an apparatus for measuring the headspace of a cartridge case. The apparatus includes a body member having a longitudinally extending bore of a preselected diameter and means for attaching the body member to one of the blades of a caliper so as to be fixed thereto and so that the longitudinal axis of the bore is aligned with an axis connecting both of said blades of the caliper. The invention further provides a bushing having a longitudinally extending bore there through of a preselected diameter less than said preselected diameter of the body member. The bushing further has at one end thereof an annular extension coaxial with its bore and having an outer diameter preselected to closely fit within the bore of the body member. Additional means are provided for fixing or locking said bushing to the body member when the annular extension is positioned within the bore of the body member. Thus the assembled bushing and body member may be mounted on and fixed to either blade of the caliper with the common longitudinal axis of the bushing and body member being aligned with an axis connecting both of the blades of the caliper. The bore of the bushing is preselected so as to have a diameter equal to or substantially similar to the datum reference circle of the case of the cartridge, the headspace of which is to be measured. The apparatus is used by positioning the neck of the cartridge case into the opening at the other end of the bushing, abutting the case head of the cartridge case against the other blade of the caliper, and adjusting the other blade of the caliper so that said opening at the other end of the bushing is abutted against the datum reference circle of the case. When the case is thus firmly positioned between said other of the blades of the caliper and the said opening at the other end of the bushing then the headspace dimension may be read out from the caliper.

Thus the present invention permits a rapid and accurate checking of cartridge and case headspace dimensions with a caliper. The apparatus is easy to use and eliminates the need for special "mics" or gauges for each cartridge that is to be reloaded. It permits one to measure variations between the fire-formed brass from the gun chamber and re-sized brass or to compare new casings with old casings that have been fired. The apparatus works with or without the bullet seated in the neck of the casing. The gauge will measure from the case head to the datum line or datum reference circle on the case shoulder. It permits one to re-size brass for a precise fit with the chamber of the gun. The gauge identifies excessive headspace situations which may rob accuracy and can be very dangerous.

An important feature of the invention is to have a family of bushings of various sizes to accommodate most "bottleneck" type casings. All of the bushings, each having a different preselected bore diameter, interchangeably fit on the same body member.

My headspace gauge measures the critical head to shoulder dimension of bottle neck type cases of all rim types, i.e., rimmed, rimless, semi-rimmed, belted, and rebated.

DETAILED DESCRIPTION OF THE INVENTION

Figure 1:
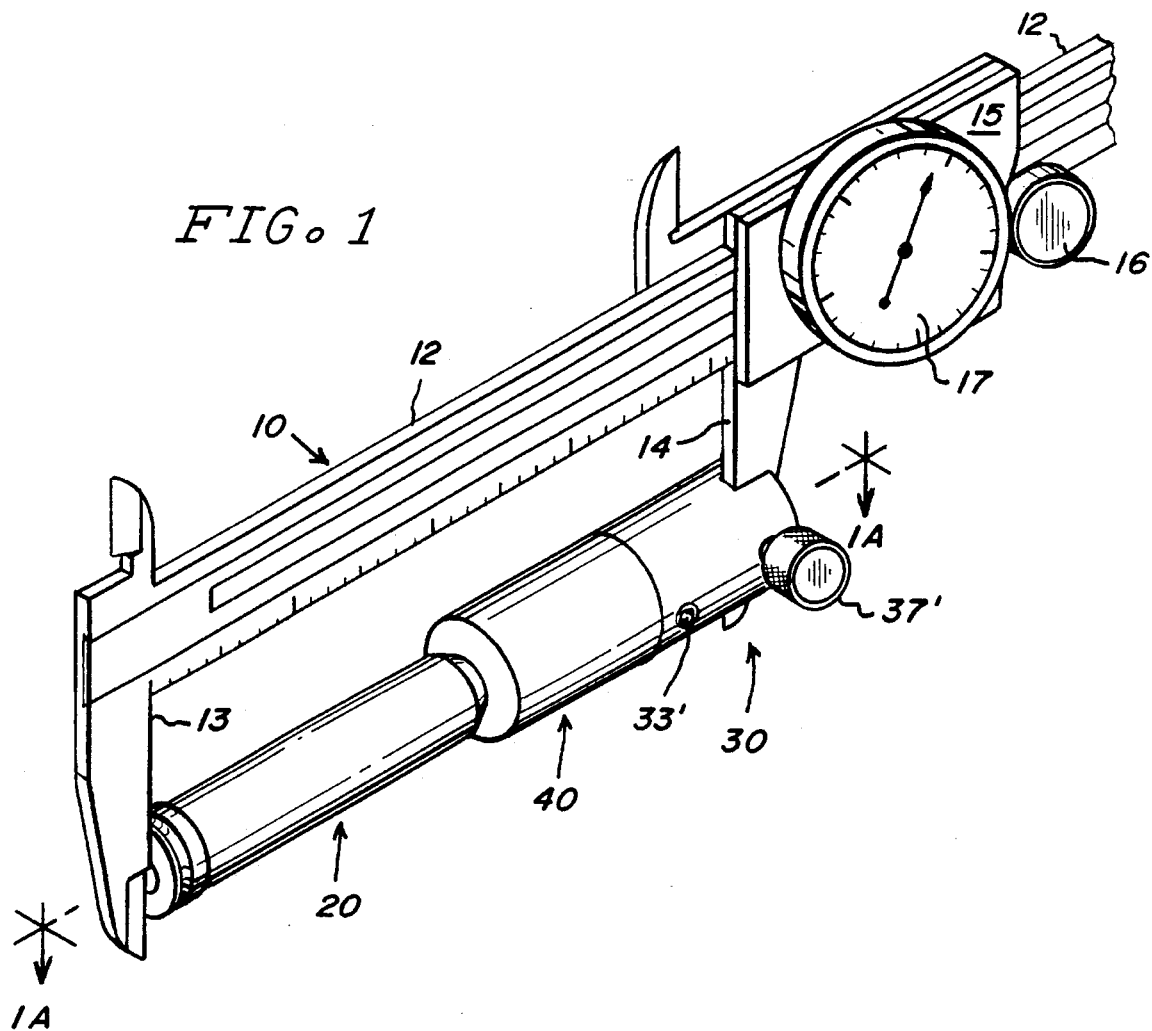
FIG. 1 is an isometric view of the caliper to which is attached a headspace gauge embodying my invention and a cartridge casing.

Referring to FIG. 1 a caliper 10 of the type well known to those skilled in the art is shown and comprises a main body or longitudinal member 12 having a fixed blade 13 at one end thereof and a moveable blade 14 positioned by a carrier 15, the carrier 15 and the blade 14 thereon being moveable along the frame 12, a vernier knob 16 being available for fine adjustments of the carrier 15. The caliper as shown includes a dial gauge 17, but other types of calipers may be used having an indicating needle or digital readout.

Also depicted in FIG. 1 is a cartridge case 20, a body member 30, and a bushing 40.

Figure 2:
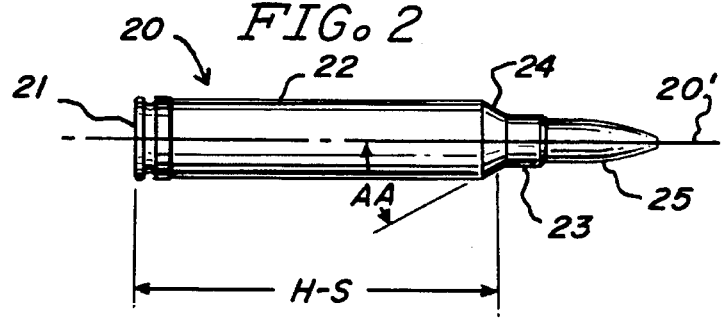
FIG. 2 is a side elevation of a typical "bottleneck" type cartridge.

In FIG. 2 is depicted a typical bottleneck type cartridge 20 comprising a case 22 having a case head 21 and a neck of reduced diameter 23, and a tapered or conical shoulder 24 connecting the case 22 with the neck portion 23. The cartridge has a longitudinal axis 20' and is shown in FIG. 2 to comprise a bullet 25 fit into the neck 23. The angle of the shoulder 24 is designated by the reference AA. As indicated above for each gun chamber and thus for each cartridge case to go into such chamber there is a datum reference circle to be visualized on the shoulder 24 of the case. In FIG. 2 the longitudinal distance along axis 20' between the case head 21 and the datum reference circle (not shown) is designated by the reference H–S; this distance is the headspace.

Figure 3:
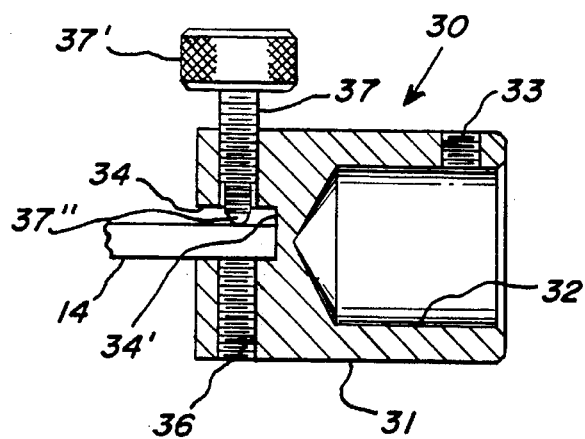
FIG. 3 is a cross sectional view of the body member shown attached or fixed to one of the arms of a caliper.
Figure 4:
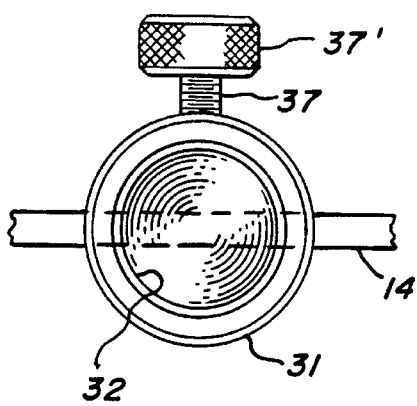
FIG. 4 is a right side view of the body member shown in FIG. 3.

The body member 30 is shown in more detail in FIGS. 3 and 4 and comprises a cylindrically shaped member 31 having a bore 32 longitudinally extending partway therethrough. A threaded bore 33 extends radially through the body member to facilitate a set screw 33' shown in FIGS. 1 and 1A. Thus one end of the body member has the bore 32. The other end of the body member has a notch 34 extending transversely to the longitudinal axis of the body member, the bottom of the notch being identified by reference numeral 34'.

A threaded bore 36 passes through member 31 at right angles to the notch 34, the axis of bore 36 passing through the notch.

Figure 5:
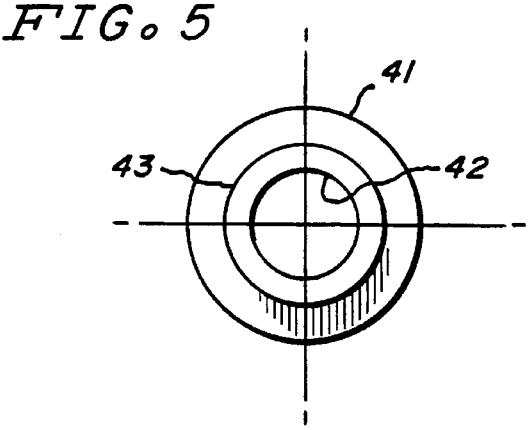
FIGS. 5 and 6 are end and side views respectively of a bushing.
Figure 6:
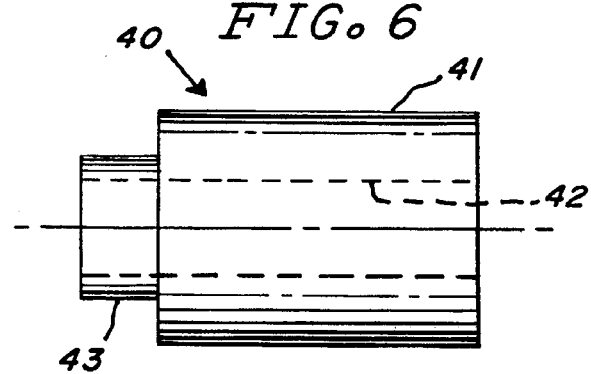

FIGS. 5 and 6 show the bushing 40 to comprise a cylindrical member 41 having a bore 42 therethrough, the bore having a diameter preselected to be equal to or substantially similar to the datum reference circle on the cartridge case to be measured. The member 41 has an annular extension 43 which is coaxial with the bore 42 and has an outer diameter preselected to closely fit within the bore 42 of the body member 30.

To utilize the apparatus, the annular extension 43 of the bushing is fit into the bore 32 of the body member and the setscrew 33' is screwed into threaded bore 33 so as to fix or lock the bushing with respect to the body member. Next a thumbscrew 37 having a turning knob 37' is screwed into the threaded bore 36 of the body member and the body member with assembled bushing is then attached-to either blade of the caliper; as shown the body member is attached to blade 14 of the caliper with the measuring edge of the arm 14 being abutted against the bottom 34' of the notch 34 as is clearly shown in FIG. 3. At this point, blade 14 is centered with the longitudinal axis of the body member 30. Then the other caliper blade 13 should be closed snugly against the assembled bushing and body member so as to align the common longitudinal axis of the bushing and body member with the caliper blades following which the thumbscrew 37 is tightened down so that the end 37" thereof clamps and holds the caliper blade 14 to the body member 30. At this point the bushing and body member assembly are clamped to the blade 14 and their common longitudinal axis is aligned with an axis connecting both of the caliper blades.

Figure 1A:
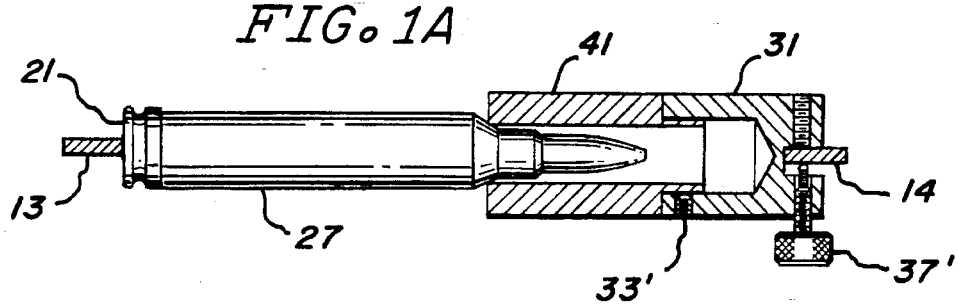
FIG. 1A is a cross section of the caliper and of the headspace gauge as viewed along section lines 1A—1A of FIG. 1.

The caliper may now be opened and a cartridge case may be moved into position so that the shoulder of the case is abutting the end of bushing 41 as is shown in FIG. 1A. The caliper should be adjusted so as to bring blade 13 to rest on the case head 21; the case should be rotated so as to remove all slack and then the operator should take the headspace reading.

As indicated it is intended, in normal usage, to have a family of bushings of different bore diameters to accommodate a corresponding variation in cartridge datum reference circles. It is simple to switch from one bushing to another, as required, by loosening the setscrew 33' to remove one bushing and replace it with a bushing having a different bore diameter.

It will be noted from FIG. 1A that the longitudinal length of the bore of the bushing 41 is sufficient so that the apparatus may be used to measure the headspace on a complete cartridge, i.e. case plus bullet.

It has been above indicated that the diameter of bore 42 of bushing 40 is preselected so as to be equal to or substantially similar to the datum reference circle of the case of the cartridge. If there is a slight variation, i.e. a few thousands of an inch between the bore diameter and the "book" or manufacturers published headspace, no problem is created because my gauge will still provide a means for measuring the headspace by first measuring either a new unfired round or a fire formed case and using the attained measurement as a benchmark. The use of a fire formed case is preferred because this case has been fire formed in the chamber of the gun, e.g., rifle, and thus the headspace of the case faithfully replicates the actual headspace of the gun.

Applicant has shown his preferred embodiment. An alternate arrangement, not shown, which would be within the scope of the present invention would be to have the body member include an annular extension which would coact with the bore of the bushing. This arrangement would not normally be favored because the preferred embodiment as shown permits, as indicated, a plurality of different bushings each having a different diameter bore and all of which, as long as they have the same outer diameter on the annular extension, will coact with and be held by the body member 31.

The foregoing is intended to communicate the principles of my invention. Modifications and changes may occur to those skilled in the art and hence it is desired not to limit the invention to the exact construction and operation shown and described.

I claim:

1. Apparatus for measuring the headspace of a cartridge case using a caliper having a fixed blade and a movable blade, said case having a case head, a body, a neck, a tapered shoulder connecting said body to said neck, and a datum reference circle on said shoulder, the longitudinal distance between said case head and said datum reference circle being the aforesaid headspace, said apparatus comprising:

a) a body member having a longitudinally extending bore with a preselected diameter and means for attaching said body member to one of the blades of a caliper so that the longitudinal axis of said bore is aligned with an axis connecting both of said blades;

b) a bushing having a longitudinally extending bore therethrough of a preselected diameter less than said preselected diameter of said body member, said bushing further having at one end thereof an annular extension coaxial with said bore of said bushing and having an outer diameter preselected to closely fit within said bore of said body member;

c) and means for fixing said bushing to said body member when said annular extension is positioned within said bore of said body member, said apparatus being further characterized by said preselected diameter of said bore of said bushing having a diameter equal to or substantially similar to the datum reference circle of a casing of a cartridge, the headspace of which is to be measured, whereby a cartridge case may be measured for headspace by (i) positioning the neck of the case into the bore opening at the end of said bushing, (ii) abutting the case head of the case against the other of the blades of the caliper, (iii) adjusting said blades of the caliper so that the end of said bushing is abutted against said shoulder of said case, and (iv) reading out from said caliper the headspace dimension measured thereby.

2. Apparatus of claim 1 wherein said bores of said body member and said bushing are coaxial when said bushing is fixed to said body member.

3. Apparatus of claim 1 wherein said body member has a cylindrical shape.

4. Apparatus of claim 3 wherein said bushing has a cylindrical shape.

5. Apparatus of claim 4 wherein the outer diameters of said body member and said bushing are substantially equal.

6. Apparatus of claim 1 wherein said body member is attached to said movable blade of a caliper.

7. Apparatus of claim 1 together with at least one additional bushing available to measure headspace on a second cartridge case having a datum reference circle different from said first mentioned case, said additional bushing having a longitudinal extending bore therethrough of a diameter equal to or substantially similar to the datum reference circle of said second cartridge case, said additional bushing also having an annular extension coaxial with the bore thereof and having an outer diameter preselected to closely fit within said bore of said body member.

8. Apparatus of claim 1 wherein said bore of said bushing has a longitudinal length preselected to accommodate a bullet held in the neck of a casing positioned into the other end of said bushing.

9. Apparatus of claim 1 wherein said means for attaching said body member to one of the blades of a caliper includes a transversely extending slot in one end of said body member, said slot having a preselected size to accommodate said one of said blades of said caliper.

10. Apparatus of claim 9 including a locking screw threaded through said body member and into said slot whereat an end surface of said screw may abut against said one of said blades of said caliper to fix said body member to said one of said blades and to hold said assembled body member and bushing so that the common longitudinal axis thereof is aligned with said axis connecting both of said blades of said caliper.

* * * * *